United States Patent
Swaminathan et al.

(10) Patent No.: US 7,913,147 B2
(45) Date of Patent: Mar. 22, 2011

(54) METHOD AND APPARATUS FOR SCRUBBING MEMORY

(75) Inventors: Muthukumar P. Swaminathan, Bangalore (IN); Achutha Kiran Kumar V. Madhunapantula, Bangalore (IN); Tessil Thomas, Bangalore (IN); Sambaran Mitra, Barasat (IN); Chandra P. Joshi, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1004 days.

(21) Appl. No.: 11/673,432

(22) Filed: Feb. 9, 2007

(65) Prior Publication Data

US 2007/0260828 A1 Nov. 8, 2007

(30) Foreign Application Priority Data

May 8, 2006 (IN) ............... 1137/DEL/2006

(51) Int. Cl.
*G06F 11/00* (2006.01)
*G11C 29/00* (2006.01)

(52) U.S. Cl. ............................... 714/763; 714/5

(58) Field of Classification Search .............. 714/5–7, 714/42, 47, 746, 763; 711/135, 154, 161
See application file for complete search history.

(56) References Cited

U.S. PATENT DOCUMENTS

| | | | |
|---|---|---|---|
| 5,511,078 A * | 4/1996 | Barucchi et al. | 714/763 |
| 6,381,658 B1 | 4/2002 | Swaminathan | |
| 6,766,429 B1 * | 7/2004 | Bland et al. | 711/161 |
| 7,089,461 B2 * | 8/2006 | Gilbert et al. | 714/47 |
| 7,346,806 B2 * | 3/2008 | Forrer et al. | 714/6 |
| 7,650,557 B2 * | 1/2010 | Totolos, Jr. | 714/763 |

OTHER PUBLICATIONS

Pending U.S. Appl. No. 11/173,641, filed Jun. 30, 2006, inventor Swaminathan et al.
Pending U.S. Appl. No. 11/471,111, filed Jun. 19, 2006, inventor Mitra.

* cited by examiner

*Primary Examiner* — Shelly A Chase
(74) *Attorney, Agent, or Firm* — Blakely, Sokoloff, Taylor & Zafman LLP

(57) ABSTRACT

Method and apparatus to scrub memory is disclosed. A patrol request, for example a read/write request, may be raised to the memory command scheduler in an out of order memory controller to scrub the memory. The patrol read/write request may be raised as and when patrol interval timer expires. The patrol read/write request may also be raised based on presence of a transaction in-flight to the memory, retry response from the memory command scheduler and correctable or non-correctable error response from the memory command scheduler. An interrupt may be raised to a processor upon completion response from the memory command scheduler.

21 Claims, 6 Drawing Sheets

METHOD AND APPARATUS FOR SCRUBBING MEMORY

This application claims priority to India Patent Application 1137DEL/2006 filed May 8, 2006.

BACKGROUND

The data stored in (Dynamic Random Access Memories) DRAMs tend to get erroneous due to various reasons like alpha particles and transient errors during writes. If left unread for a long time, the number of erroneous bits may go higher, making the error uncorrectable. To avoid this situation, memory controllers usually implement a scheme called 'patrol scrubbing', wherein each data entry in the entire memory is read periodically and if it has a correctable error, it will be corrected and written back to the memory, thereby avoiding the accumulation of errors.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other stances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
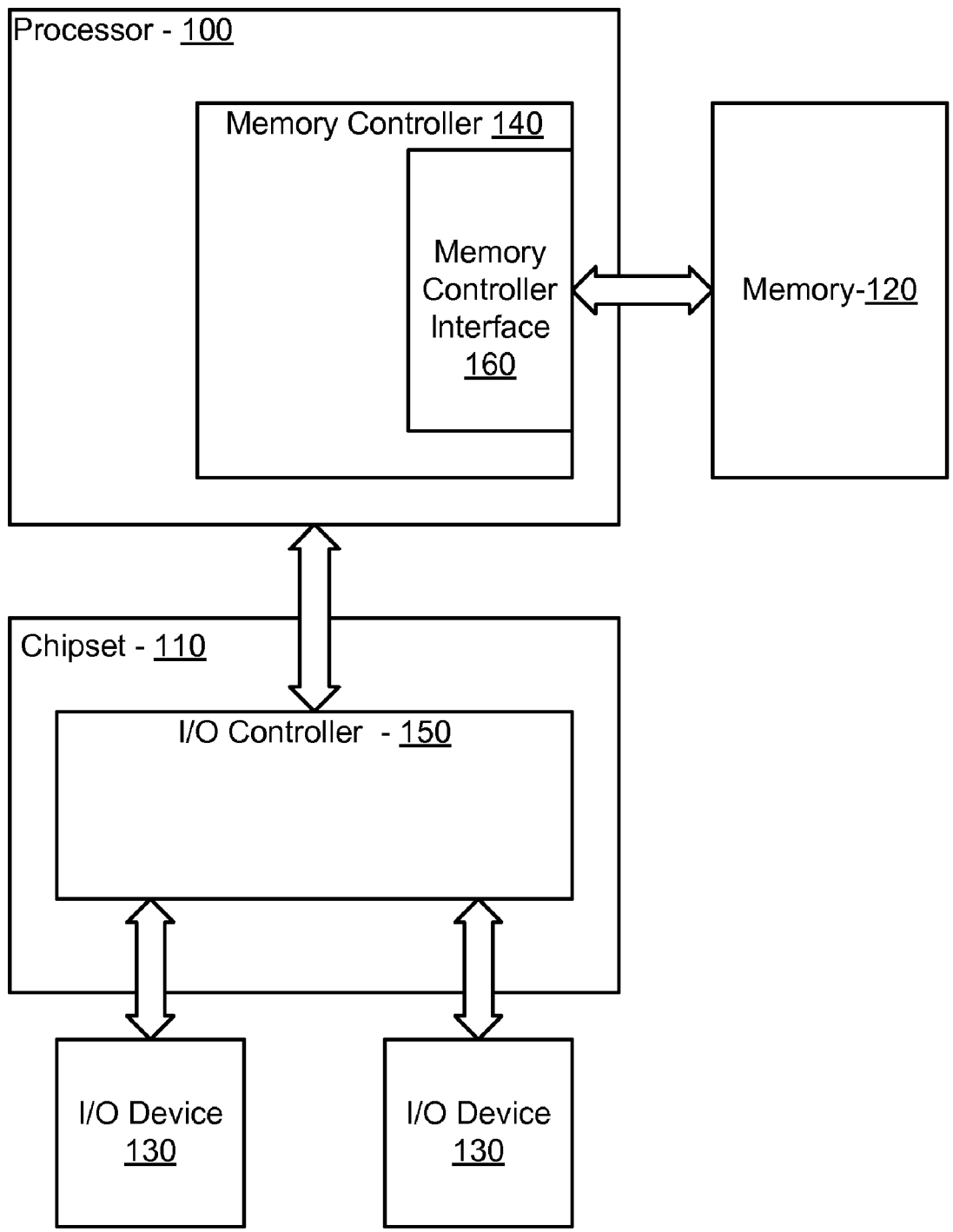
FIG. 1 illustrates an embodiment of a computer system.

Referring to FIG. 1, an embodiment of a computer system is shown. The computer system may include a processor 100, a chipset 110, a memory 120, and I/O (input/output) devices 130. As depicted, the processor 100 may be coupled with the chipset 110 via a processor bus. The memory 120 may be coupled with the processor 100 via a memory bus. The I/O devices 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc.

The processor 100 may comprise one or more integrated circuits or chips to implement the processor 100. As depicted the processor 100 may comprise a memory controller (MC) 140 and a memory controller interface 150. In one embodiment the processor 100 may be implemented with an Intel® Pentium® 4 processor, Intel® Pentium® M processor, and/or another type of general purpose processor capable of executing software and/or firmware instructions. The processor 100, according to an embodiment, may execute instructions stored in the memory 120 to perform various tasks and to control the overall operation of the computer system. In one embodiment the processor 100 may also scrub the memory 120 having corrupt data which may affect data consumers.

In one embodiment the memory controller 140 may be provided with the chipset 110 and the memory controller interface 150 may be provided to couple the memory controller 140 with the memory devices of the memory 120. The memory controller 140 may read and/or write data to memory devices of the memory 120 in response to requests received from the processor 100 and/or I/O devices 130. The memory 120 may comprise for example RAM (Random Access Memory) devices such as source synchronous dynamic RAM devices and DDR (Double Data Rate) RAM devices.

According to an embodiment of the invention, the memory controller 140 may maintain data dependency relationship. The memory controller 140 may issue a patrol request, for example a patrol read/write request, to scrub the memory 120 even in case of an out of order scheduler based memory controller. That is the memory controller may complete memory transaction requests, for example read/write request, in an order other than the order in which the requests may be received.

The chipset 110 may comprise one or more integrated circuits or chips to couple the chipset 110 with other components of the computer system. As depicted, the chipset 110 may comprise an I/O controller (I/O C) 160. The ICH 160 according to an embodiment may comprise an I/O interface such as for example, a PCI Express interface to interface the I/O devices 130 with the I/O controller 160, thus permitting data transfers between the processor 100 and the I/O devices 130 and between the memory 120 and the I/O devices 130. In one embodiment the ICH 160 may be provided in the processor 100.

As depicted, the computer system may also comprise I/O devices 130. The I/O device 130 may implement various input/output functions for the computer system. For example, the I/O device 130 may comprise hard disk drives, keyboards, mice, CD (compact disc) drives, DVD (digital video discs) drives, printers, scanners, etc.

Figure 2:
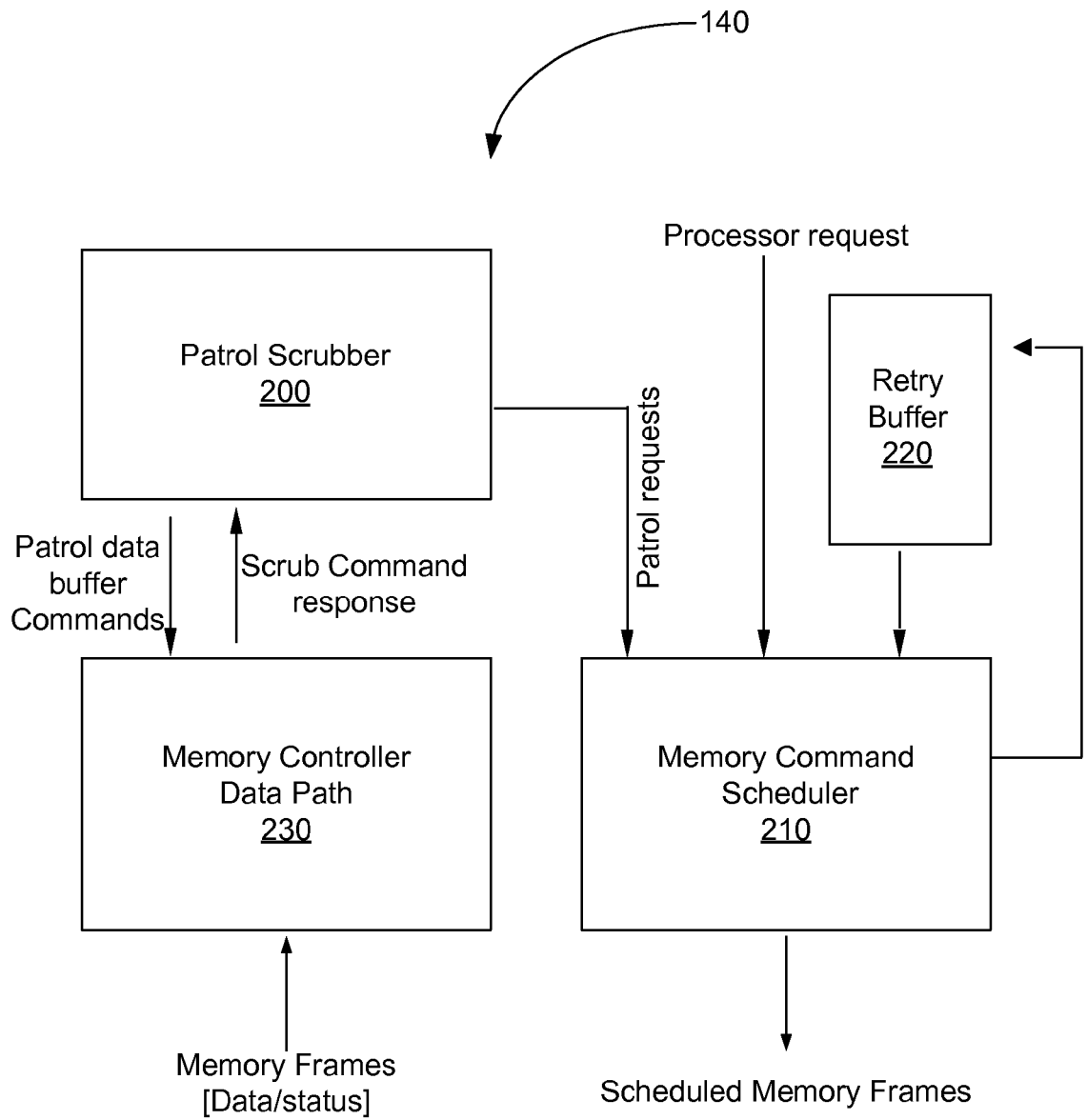
FIG. 2 illustrates an embodiment of a memory controller.

Referring to FIG. 2, an embodiment of a memory controller (MC) 140 is illustrated. As depicted the memory controller 140 may comprise a patrol scrubber 200, a memory command scheduler 210, a retry buffer 220 and memory controller data path 230. The patrol scrubber 200 may be coupled to memory controller data path 200 and to the memory command scheduler 210. The memory command scheduler 210 may be coupled to the memory controller data and to the retry buffer 220. The memory command scheduler may also be coupled to the processor 100.

The patrol scrubber 200 may raise a patrol request, for example a patrol read request, to a memory command scheduler 210 after patrol time interval expires. The patrol scrubber 200 may determine as to whether there is a transaction, for example the read or write request, in-flight to same memory address, for example same rank and bank of a memory 120. If there is transaction in-flight to the same memory address, the patrol scrubber may raise the request again till it is accepted. The working function of the patrol scrubber 200 shall be discussed in detail herein after with respect to FIG. 3.

The memory command scheduler 210 may accept the patrol request received from the patrol scrubber 200 to schedule the patrol request on a memory, for example a memory bus such as a fully buffered DIMM (FBD), in order to complete the patrol request. The patrol request may be scheduled on the memory bus, for example fully buffered DIMM, to send the request to the memory 120 through a data path 230 in order to complete the request. A request acknowledgement may be sent to the patrol scrub logic 310 indicating completion of the request without any errors by the memory controller data path 230. In one embodiment, the patrol request may not be completed without encountering any error. The memory command scheduler 210, in one embodiment, may receive a request, for example a read/write request, from the processor 100 also.

As depicted, the memory controller data path 230 may receive scheduled memory frames, for example fully buffered DIMM (FBD) frames, from a memory, for example dual inline memory module (DIMM), bus having data requested by a read request from the scheduler. The patrol scrubber 200 may send a patrol data buffer command to the memory controller data path 200. The memory controller data path 200 may check the data, for example read data, of the patrol request and correct the data of the request in case of a correctable error. The memory controller data path 230 may, after correcting the request, send an error corrected response to the patrol scrubber 200. However, in one embodiment, the request may have an uncorrectable error in the read data and in such a situation the memory controller data path 230 may poison the data of the read request and may send an uncorrectable error response to the patrol scrub logic 200. The patrol scrubber 200, in case of the uncorrectable error response, may raise a new request, for example write request, to the memory command scheduler 210 and may follow the same process as discussed herein above till the write request may be accepted. In one embodiment, the patrol scrubber 200 may also issue a patrol scrub request for example a read request to the command scheduler 210 as and when the patrol interval timer expires.

Figure 3:
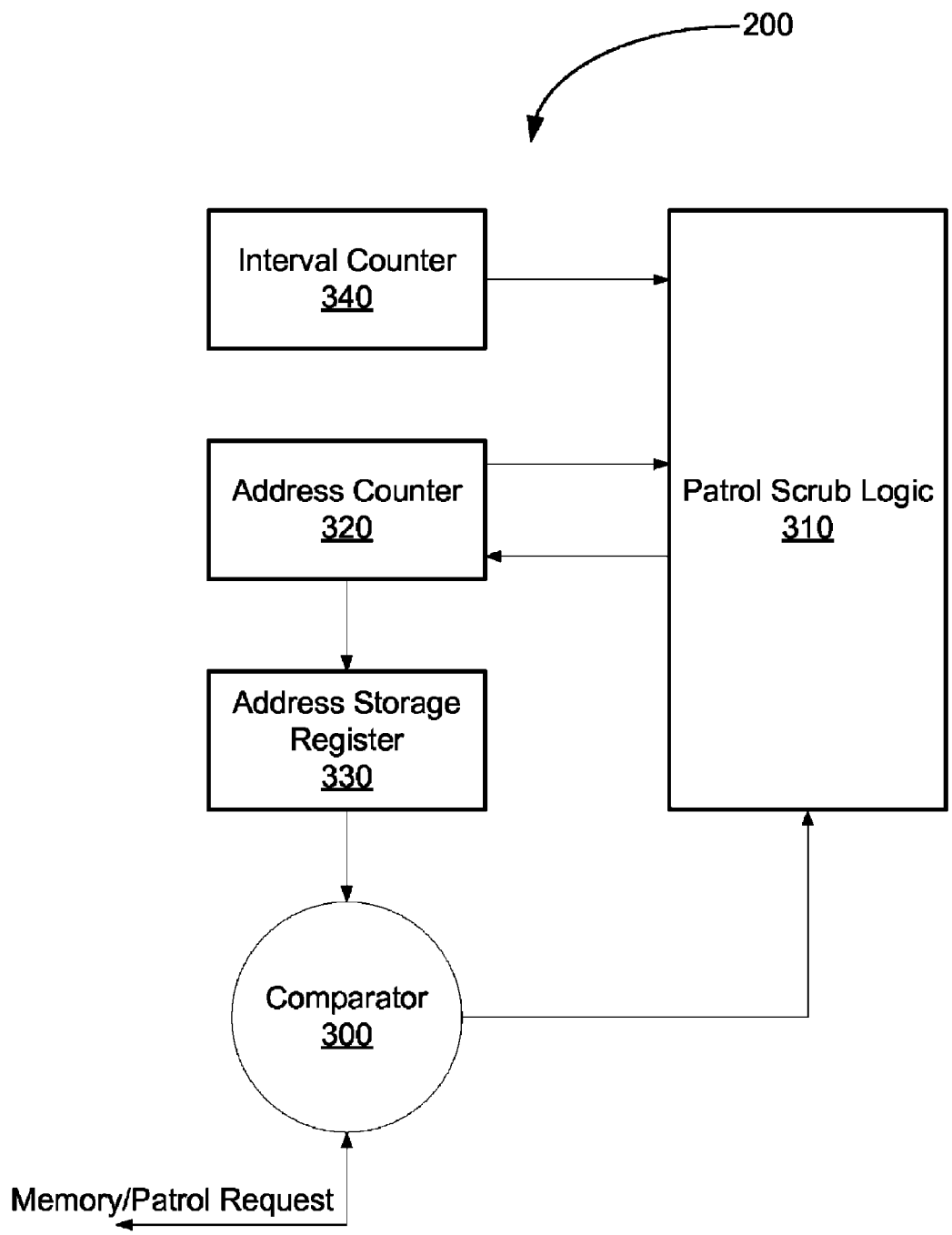
FIG. 3 illustrates an embodiment of a patrol scrubber of FIG. 2.

Referring to FIG. 3, an embodiment of a patrol scrubber 200 is illustrated. As depicted the patrol scrubber 200 may comprise a comparator 300, a patrol scrub logic 310, an address counter 320, an address storage register 330 and an interval counter 340. As depicted, comparator 300 may be coupled with the patrol scrub logic 310 and the patrol scrub logic may be coupled with the address counter 320. The address counter 320 may be coupled to the address storage register 330 which may be coupled to the comparator 300. The interval counter 340 may be coupled with the patrol scrub logic 310.

The patrol scrub logic 310, in one embodiment, may raise a patrol scrub request, for example a read request, upon receiving the patrol interval timer expiration signal, and may send the request to an address counter 320. The address counter 320 may register the request and may transmit the request along with the current patrol address to an address storage register 330 so as to forward the same to a memory command scheduler 210. The comparator 300 may compare the address of a pending patrol request with an incoming processor's read request address. If the addresses match then the patrol request may not be required and the address counter 320 may be incremented. The interval counter 340 may provide the indication to the patrol scrub logic 310 regarding the expiration of the time interval so as to raise the patrol request to a new address.

The patrol scrub logic 310 may latch the patrol read address in a comparison register 330 and a "patrol on" flag may be set to the request. The patrol scrub logic 310 may determine as to whether there is a transaction, for example the read or a write request, in-flight to same memory address, for example a rank, of a memory 120. The memory may, for example, comprise a dynamic random access memory (DRAM). If there is a transaction in-flight to the same memory address of the memory 120, the patrol scrub logic 310 may raise the patrol read request again till the patrol read request is accepted by the memory command scheduler 200. In one embodiment, there may be no transaction in-flight to the same memory address of the memory 120, in such a situation the patrol scrub logic 310 may transmit the read request to the memory command scheduler 220.

According to an embodiment of the invention, the patrol scrub logic 310 may maintain data dependency relationship even though the memory command scheduler dispatches commands on the memory bus in an order other than the order in which the command were sent to the memory command scheduler 210. This may be achieved by making sure that all the transactions, in-flight in the scheduler 210, to the same address may be completed before the patrol request may be send to the out of order scheduler and by making sure that any new request from the processor 100 to the same memory address, as the current patrol request in progress, may be pushed to retry buffer 220 for execution after the patrol request completion. In one embodiment, all the transactions inflight in the scheduler to the same memory address may be drained and the scheduler may has a bit for every memory, for example rank bank, for tracking transactions inflight to that memory rank, bank. The patrol transactions rank, bank may be used to index into this inflight transaction tracker. In one embodiment the bit may be set corresponding to the patrol transactions rank, bank, indicating that there is a transaction inflight and the patrol request may not be accepted by the scheduler.

The memory command scheduler 210 upon receiving the memory request may schedule the patrol request on a memory bus, for example, a fully buffered DIMM (FBD) link, in order to complete and dispatch the patrol request to the memory 120. A patrol request acknowledgement/indication may be sent to the patrol scrub logic 310, indicating completion of the request without any errors, by the memory controller data path and the patrol address counter 320 may be incremented so as facilitate raising a new patrol request. In one embodiment, the patrol read request may not be completed without encountering any error and in such a situation the patrol request may get a retry response indicating possible correctable fully buffered DIMM link error, or may receive a corrected error response indicating that error(s) have been detected and corrected or an uncorrectable error response indicating that the error detected was uncorrectable. In one embodiment, the patrol write request may get an uncorrectable response indicating that it was not finished without errors. In case of an uncorrectable error for a write request an interrupt may be issued/sent to the processor. If the patrols scrub logic 310 receives for the request, for example, a retry response indicating possible correctable link error, a patrol request for example a read request may be raised again to the same memory address. The patrol scrub logic 310 may again determine as to whether there is a transaction, for example the read request, in-flight to the same memory address of a memory 120. If there is a transaction in-flight to the same memory address of the memory 120, then the patrol request may be raised again till the request is accepted. However, if there is no transaction in-flight to the same memory address of the memory 120, the patrol request may be sent to the memory command scheduler 210. The memory command scheduler 210 may accept the patrol request to schedule the patrol request on the memory bus, for example a fully buffered DIMM (FBD) bus. A patrol request acknowledgement/indication may be sent to the patrol scrub logic 310 indicating completion of the request without any errors by the memory controller data path 230 and the patrol address counter 320 may be incremented so as facilitate raising a new patrol request. If the patrol request is not completed without errors, then the patrol request may get a "retry" response indicating possible correctable error for example a link error and the retry attempt counter may be incremented. If the retry attempt counter's value is greater than the configured threshold value then an interrupt may be raised to the processor 100. In one embodiment, the patrol request may not get a retry response but it may get a corrected response or an uncorrectable response, in that case a patrol write request may be raised. For corrected error response, corrected data may be written back in the memory address of the memory and for uncorrectable error response poisoned data may be written back in the memory address of the memory. The poisoned data may have a special poison encoding so that any consumer of the data may immediately generate a machine check exception in order to avoid the use of the corrupt data.

The patrol scrub logic 310, after receiving the corrected or uncorrectable error response may raise a request, for example a write request, and may again determine as to whether there is a transaction still in-flight to the same memory address for example rank of the memory 120. If there is a transaction in-flight to the same memory address of the memory 120, the patrol scrub logic 310 may raise the write request again till the write request is accepted by the memory command scheduler 200. If there is no transaction in-flight to the same memory address of the memory 120, the patrol scrub logic 310 may send the patrol write request to the memory command scheduler 210, to schedule the write request on a memory bus, for example the fully buffered DIMM (FBD), so as to complete the request. If the memory controller data path sends the request completion acknowledgement or indication to the patrol scrub logic 310, indicating that request completed without any errors then the patrol address counter 320 may be incremented so as to raise a new patrol request. In one embodiment, if the write request is not completed without errors then an interrupt may be raised to the processor 100.

According to an embodiment and once a patrol request to a particular address is raised, any new request from the processor 100 to the same memory address of the memory 120 may be pushed into the retry buffer till the patrolling process of that address is completed. This may be achieved by setting a "patrol on" flag at the time of raising the patrol scrub request to the memory address and comparing the address of the incoming processors request with the current patrol address stored in the comparison register.

Figure 4A:
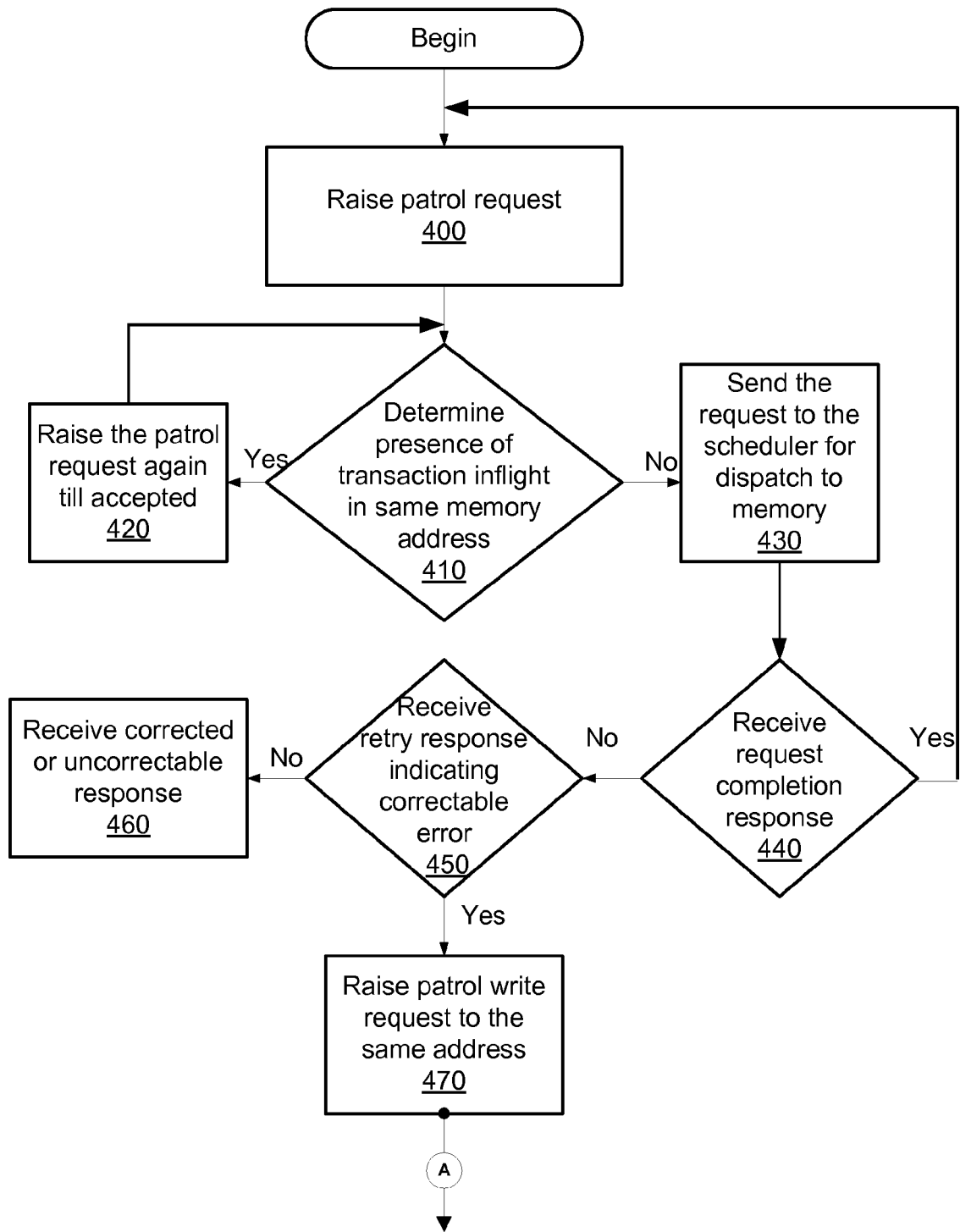
FIGS. 4A&4B illustrates an embodiment of the process that may be implemented by the system of FIG. 1
Figure 4B:
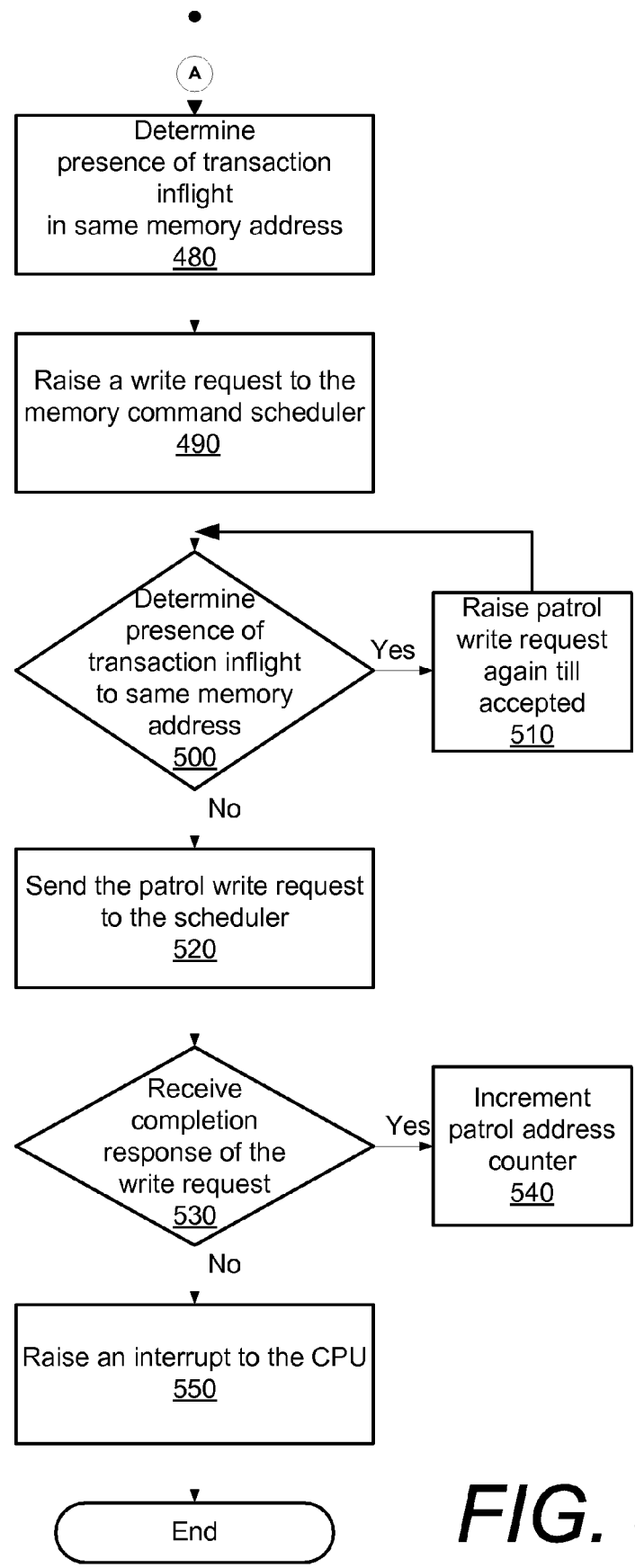

Referring now to FIGS. 4A&4B, an embodiment of memory scrubbing process implementable by the system of FIG. 1 is illustrated. As depicted in block 400, the patrol scrub logic 310 may raise patrol request, for example a read request, after expiry of patrol interval time, to be sent to a memory command scheduler 210. Also, the patrol scrub logic 310 may latch the patrol read address in a comparison register 330 and "patrol on" flag may be set.

In block 410, the patrol scrub logic 310 may determine as to whether there is a transaction in-flight to same memory address. If there is a transaction in-flight to the same memory address, the patrol scrub logic 310 may raise the patrol request again till the request is accepted (see block 420). However, if there is no transaction in-flight to the same memory address of the memory 120, the patrol scrub logic 210 may send the patrol request to a memory command scheduler 210 to dispatch the patrol request to memory (see block 430).

As shown in block 440, a patrol request acknowledgement/indication may be sent to the patrol scrub logic 310 indicating completion of the request without any errors by the memory controller data path and the patrol address counter 320 may be incremented so as facilitate raising a new patrol request.

In block 450, the request may not be completed and in this case the request may receive a retry response indicating possible correctable link error from the memory controller data path. In one embodiment, if the retry attempt counter's value may be greater than the configured threshold value then an interrupt may be raised to the processor. If the retry attempt counter's value is not greater than the configured threshold value then the patrol scrub logic may raise a patrol request, for example the read request, again to the same memory address (see block 470) and the retry attempt counter may be incremented.

As depicted in block 460, the request may receive corrected or uncorrectable response from the memory controller data path indicating that the detected error has been corrected or that the error detected in the data returned from memory is uncorrectable. For corrected error response corrected data may be written back in the memory address of the memory and for uncorrectable error response poisoned data may be written back in the memory address of the memory. For this the patrol scrub logic will raise a write request (see block 470)

In block 480, the patrol request may be processed in the same manner as herein described above with regard to the blocks 400-450 so as to determine presence of a transaction to the same memory address and completion of the request. If the request is completed without errors, the patrol scrub logic may receive request completion acknowledgement from the memory controller data path and the patrol address counter may be incremented. But if the request is not completed without errors, the request may get a retry response indicating possible correctable link error and the process may be repeated in block 450.

IN block 490, the request may not be completed without errors and also the request may not get a retry response then a write request may be raised to the memory command scheduler. For corrected error response corrected data may be written back in the memory address of the memory and for uncorrectable error response poisoned data may be written back in the memory address of the memory.

In block 500, the patrol scrub logic, having decided to raise the write request, may determine as to whether there is a transaction in-flight to the memory for example same memory address of the memory. If there is a transaction in-flight to the same memory address of the memory, the patrol scrub logic may raise patrol write request again till it is accepted by the memory command scheduler (see block 510). If there is no transaction in-flight to the same memory address, the patrol scrub logic may send the patrol request to the memory command scheduler to schedule the patrol request on the FBD wires in order to complete the patrol request (see block 520) and sent the request completion response to the patrol scrub logic.

In block 530, the patrol scrub logic receives patrol request completion response from the memory controller data path. Normally the request may be completed without error. However, in one embodiment the write request may not be completed without errors and in such a situation the patrol scrub logic may raise an interrupt to the processor (see block 540).

Figure 5:
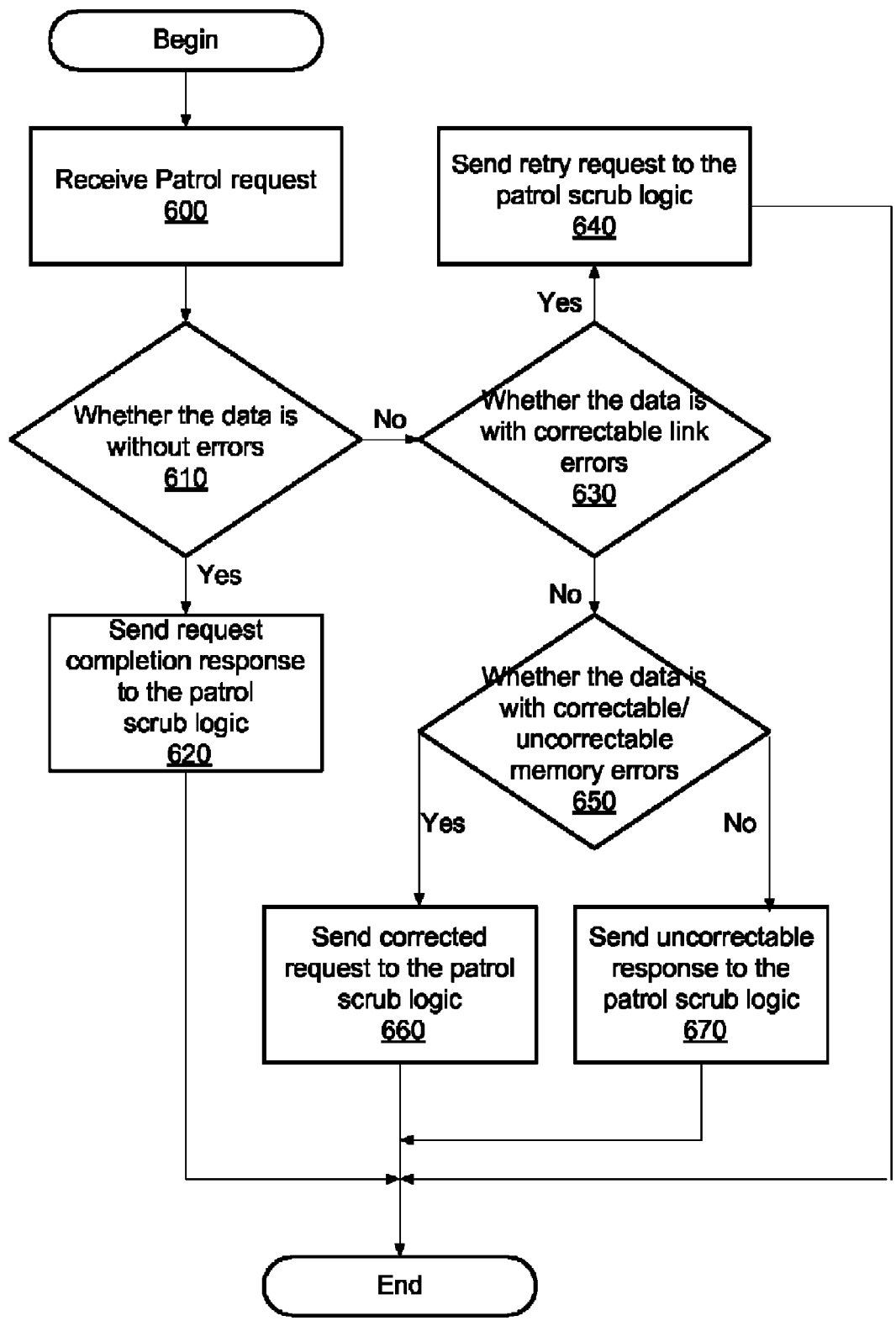
FIG. 5 illustrates another embodiment of the process that may be implemented by the system of FIG. 1.

Referring now to FIG. 5, an embodiment of memory scrubbing process implementable by the system of FIG. 1 is illustrated. As depicted in block 600 the memory command scheduler 210 may receive a request, for example a read/write request, from the patrol scrub logic 310 and schedule the request on the FBD wires to dispatch the request to the memory for example through memory controller data path 230.

In block 610, the memory controller data path 230 may check whether the data returned for read is without errors. If the data is without errors then an acknowledgement of request completion may be sent to the patrol scrub logic 310 (see block 620). In one embodiment the request may not be completed without errors.

In block 630, the memory controller data path 230 may check whether the request data is with errors, for example a link error, and if the data returned for the read request has link error in it, a retry request may be sent to the patrol scrub logic 310 (see block 640). However, in case of a write request, the memory controller data path may check for absence of an error indication from the memory for a specified period of time, and if there is no error indication from the memory then the write may be completed without errors and an acknowledgement of request completion may be sent to the patrol scrub logic. If there is an error indication, then an uncorrectable response may be sent to the patrol scrub logic.

In block 650, it may again be checked whether the request data is with errors, for example a correctable error or an uncorrectable error. If the request data has a correctable error then a corrected response may be sent to the patrol scrub logic 310 (see block 660). However, if the request data has an uncorrectable error then an uncorrectable response may be sent to the patrol scrub logic 310 (see block 670).

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to scrub memory comprising
raising a patrol request to a memory command scheduler in an out of order memory controller;
determining presence of a transaction in-flight to the memory;
receiving a patrol request completion response from the memory command scheduler; and
raising an interrupt request to a processor.

2. The method of claim 1, wherein raising the patrol request comprises raising the patrol request to the memory command scheduler after expiry of patrol interval time.

3. The method of claim 1, wherein raising the patrol request comprises raising the patrol request to the memory command scheduler based on completion of patrol interval time.

4. The method of claim 1, wherein raising the patrol request comprises sending the patrol request based upon presence of the transaction in-flight to the memory.

5. The method of claim 1, further comprising sending the patrol read request based upon retry response from the memory command scheduler.

6. The method of claim 1, further comprising raising a patrol write request to the memory command scheduler based upon uncorrectable error response in read data.

7. The method of claim 1, wherein raising the interrupt request to the processor is based upon a write request completion signal from the memory command scheduler.

8. The method of claim 1, wherein determining presence of the transaction to the memory comprises determining as to whether there is a transaction in-flight to a rank of the memory.

9. A method to scrub memory comprising
receiving, from a patrol scrub logic, a patrol request in an out of order memory controller;
scheduling the patrol request on a memory, wherein scheduling includes sending a retry response to a patrol scrub logic if the patrol request is rejected; and
sending a patrol request completion response to the patrol scrub logic.

10. The method of claim 9, wherein scheduling the patrol request on the memory comprises accepting the patrol request received from the patrol scrub logic and scheduling the patrol request on the memory.

11. The method of claim 9, wherein sending the patrol request comprises sending a patrol request non-completion indication to the patrol scrub logic.

12. An apparatus comprising
a patrol scrub logic to raise a patrol request in an out of order memory controller;
a memory command scheduler to schedule the patrol request on a memory; and
a memory controller data path to check errors and generate a response to be sent to the patrol scrub logic; and
a buffer to generate a retry response with respect to the patrol request based on non-acceptance of the patrol request by the memory command scheduler.

13. The apparatus of claim 12, the memory controller data path to further generate a write request based on an uncorrectable error present in read data.

14. The apparatus of claim 12, wherein the patrol scrub logic to raise an interrupt to the processor based on non-acceptance of the write request by the memory command scheduler.

15. A system comprising
a memory to store data;
a chipset to facilitate input-output (I/O) signal to be transmitted to a computer system;
an I/O device to provide instructions to a computer system; and
a processor to raise a patrol request in an out of order memory controller to scrub the memory after an expiry of a patrol interval time.

16. The system of claim 15, wherein the memory controller is included in the processor.

17. The system of claim 15, wherein the memory controller is included in the chipset.

18. The system of claim 15, the processor to further raise a patrol read request based upon presence of a transaction in-flight to the memory.

19. The system of claim 18, further comprising a patrol scrubber to send the patrol read request based upon a retry response from a memory command scheduler.

20. The system of claim 19, the patrol scrubber to further raise an interrupt request to the processor based on a patrol write request non-completion signal.

21. The system of claim 15, the processor to further raise a patrol write request upon an uncorrectable error response in read data.

* * * * *

UNITED STATES PATENT AND TRADEMARK OFFICE
CERTIFICATE OF CORRECTION

| | | |
|---|---|---|
| PATENT NO. | : 7,913,147 B2 | Page 1 of 1 |
| APPLICATION NO. | : 11/673432 | |
| DATED | : March 22, 2011 | |
| INVENTOR(S) | : Swaminathan et al. | |

It is certified that error appears in the above-identified patent and that said Letters Patent is hereby corrected as shown below:

In column 8, at line 28 in claim 12, after, -- memory; -- delete "and".

Signed and Sealed this
Sixteenth Day of August, 2011

David J. Kappos
*Director of the United States Patent and Trademark Office*